US010678542B2

(12) United States Patent
Kountanis et al.

(10) Patent No.: US 10,678,542 B2
(45) Date of Patent: Jun. 9, 2020

(54) NON-SHIFTING RESERVATION STATION

(71) Applicant: Apple Inc., Cupertino, CA (US)

(72) Inventors: Ian D. Kountanis, Santa Clara, CA (US); Mahesh K. Reddy, Austin, TX (US)

(73) Assignee: Apple Inc., Cupertino, CA (US)

( * ) Notice: Subject to any disclaimer, the term of this patent is extended or adjusted under 35 U.S.C. 154(b) by 318 days.

(21) Appl. No.: 14/808,811

(22) Filed: Jul. 24, 2015

(65) Prior Publication Data

US 2017/0024205 A1 Jan. 26, 2017

(51) Int. Cl.
*G06F 9/30* (2018.01)
(52) U.S. Cl.
CPC .................. *G06F 9/3005* (2013.01)
(58) Field of Classification Search
CPC ...... G06F 9/3005; G06F 9/384; G06F 9/3836; G06F 9/3838; G06F 9/3842
USPC .......................................................... 712/217
See application file for complete search history.

(56) References Cited

U.S. PATENT DOCUMENTS

| 5,519,864 | A | 5/1996 | Martell et al. | |
|---|---|---|---|---|
| 6,098,166 | A * | 8/2000 | Leibholz | G06F 9/3824 712/215 |
| 6,185,672 | B1 | 2/2001 | Trull | |
| 6,205,542 | B1 * | 3/2001 | Grochowski | G06F 9/3836 712/219 |
| 6,237,081 | B1 * | 5/2001 | Le | G06F 9/3836 712/205 |
| 6,378,062 | B1 * | 4/2002 | Abramson | G06F 9/30043 712/200 |
| 6,385,715 | B1 * | 5/2002 | Merchant | G06F 9/383 712/218 |
| 6,785,802 | B1 | 8/2004 | Roy | |
| 6,981,129 | B1 * | 12/2005 | Boggs | G06F 9/3842 712/218 |
| 9,367,322 | B1 * | 6/2016 | Brownscheidle | G06F 9/3836 |
| 2006/0179274 | A1 * | 8/2006 | Jones | G06F 9/3802 712/205 |
| 2007/0028078 | A1 * | 2/2007 | Harris | G06F 9/3814 712/214 |
| 2007/0198812 | A1 * | 8/2007 | Abernathy | G06F 9/3836 712/214 |
| 2009/0063735 | A1 * | 3/2009 | Ng | G06F 9/3855 710/54 |

(Continued)

*Primary Examiner* — William B Partridge
(74) *Attorney, Agent, or Firm* — Kowert Hood Munyon Rankin and Goetzel PC; Rory D. Rankin

(57) ABSTRACT

Systems, apparatuses, and methods for implementing a non-shifting reservation station. A dispatch unit may write an operation into any entry of a reservation station. The reservation station may include an age matrix for determining the relative ages of the operations stored in the entries of the reservation station. The reservation station may include selection logic which is configured to pick the oldest ready operation from the reservation station based on the values stored in the age matrix. The selection logic may utilize control logic to mask off columns of an age matrix corresponding to non-ready operation so as to determine which operation is the oldest ready operation in the reservation station. Also, the reservation station may be configured to dequeue operations early when these operations do not have load dependency.

14 Claims, 12 Drawing Sheets

(56) References Cited

U.S. PATENT DOCUMENTS

| | | | | |
|---|---|---|---|---|
| 2010/0205406 A1* | 8/2010 | Hooker | ............... | G06F 9/30076 |
| | | | | 712/208 |
| 2010/0332806 A1* | 12/2010 | Golla | .................... | G06F 9/3838 |
| | | | | 712/216 |
| 2013/0046956 A1* | 2/2013 | Tran | .................... | G06F 9/30087 |
| | | | | 712/208 |
| 2014/0380024 A1* | 12/2014 | Spadini | ................ | G06F 9/3834 |
| | | | | 712/217 |
| 2015/0007188 A1* | 1/2015 | Sutanto | ................ | G06F 9/3855 |
| | | | | 718/104 |
| 2015/0277925 A1* | 10/2015 | Sleiman | ................ | G06F 9/3851 |
| | | | | 712/215 |
| 2015/0363205 A1* | 12/2015 | Guo | ..................... | G06F 9/3855 |
| | | | | 712/214 |
| 2016/0350120 A1* | 12/2016 | Col | ..................... | G06F 9/30043 |
| 2016/0350123 A1* | 12/2016 | Col | ..................... | G06F 9/30043 |

\* cited by examiner

NON-SHIFTING RESERVATION STATION

BACKGROUND

Technical Field

Embodiments described herein relate to the field of processors and more particularly, to implementing non-shifting reservation stations.

Description of the Related Art

A processor is generally hardware circuitry designed to execute instructions defined by a particular instruction set architecture. While the instructions are being processed, the processor may store the instructions in one or more reservation stations. Each reservation station may be coupled to a respective execution unit and may be configured to schedule instruction operations for execution in the respective execution unit.

Many types of processors include reservation stations for storing operations to be executed. A reservation station holds state information about a number of operations waiting to be issued to the processor's execution unit(s). Most reservation stations are shifting structures, with operations coming into one side (e.g., the bottom) of the reservation station with existing operations shifted up as new operations come into the reservation station. Shifting reservation stations write the same operation multiple times as it shifts through the structure, burning power unnecessarily. This shifting results in a lot of extra writes and wasted power as the operations are moved through the reservation station. For example, if three operations are shifted into the reservation station in a given clock cycle, this results in three writes, plus potentially three more writes as three existing operations are shifted up to higher slots in the reservation station. Further, for a shifting reservation station, the fuller the reservation station becomes, the more power it consumes, since a single operation written into the reservation station can cause an almost full reservation station to shift up multiple entries to make room for the new operation.

SUMMARY

Systems, apparatuses, and methods for implementing a non-shifting reservation station are contemplated.

In various embodiments, a processor may include at least a dispatch unit, one or more non-shifting reservation stations, and one or more execution units. The dispatch unit may be configured to dispatch instruction operations to any of a plurality of entries of the non-shifting reservation station(s). Each non-shifting reservation station may be configured to keep each operation in the same entry until issuance to a corresponding execution unit without shifting the operation into a different entry when new operations are written to the reservation station.

In one embodiment, each non-shifting reservation station may include a plurality of entries for storing operations, an age matrix, control logic, and selection logic for selecting operations to issue to a corresponding execution unit. The age matrix may include an age vector for each entry of the reservation station, and each age vector may include indicators designating a relative age of the operation in comparison to other operations stored in the reservation station. The control logic may be configured to mask off age vectors of non-ready operations to prevent these operations from blocking younger ready operations from issuing to the execution unit. The selection logic may be configured to utilize the age matrix and control logic for determining and issuing the oldest ready operations from the reservation station to the execution unit. In one embodiment, the selection logic may select one or more of the oldest ready ops from the ops stored in the reservation station. The number of ops selected in a single clock cycle may vary according to the embodiment. In another embodiment, the selection logic may select the oldest ready operation from a first portion of the reservation station entries in a given clock cycle and the oldest ready operation from a second portion of the reservation station entries in the given clock cycle. In one embodiment, the first portion may include the even reservation station entries and the second portion may include the odd reservation station entries.

In various embodiments, the reservation station may be configured to determine whether an issued non-load operation is directly or indirectly dependent on a load operation. In one embodiment, the reservation station may prevent operations with direct or indirect dependencies on a load operation from dequeuing until a shadow kill window has expired. The shadow kill window may be any number of clock cycles, depending on the embodiment. If a given non-load operation does not have a direct or indirect dependency on a load operation, then after the given non-load operation is issued to an execution unit, the given non-load operation may be dequeued early from the reservation station without waiting for the shadow kill window to expire.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
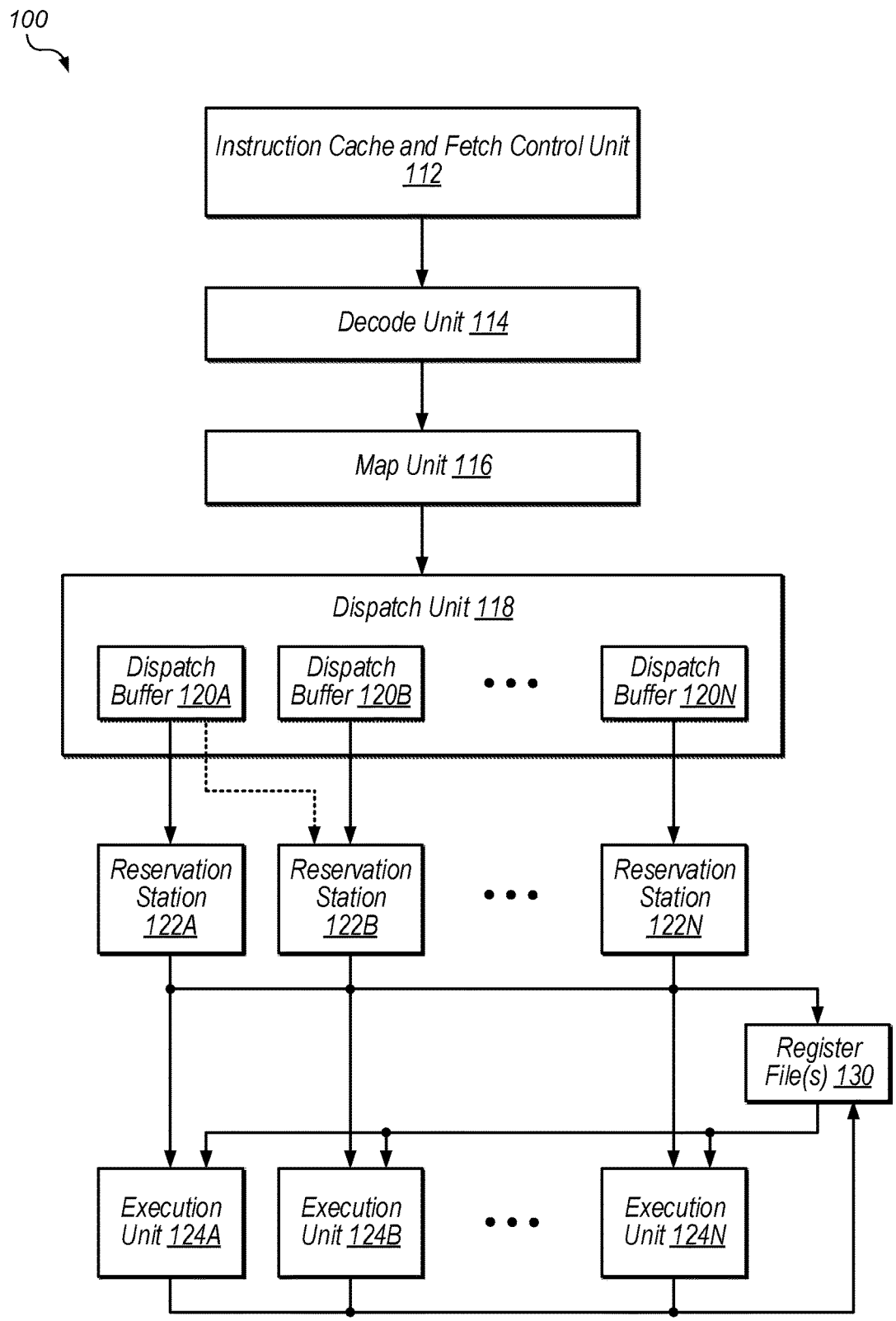
FIG. 1 is a block diagram illustrating one embodiment of a portion of a processor.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a processor . . . ." Such a claim does not foreclose the system from including additional components (e.g., a display, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Turning now to FIG. 1, a block diagram of one embodiment of a portion of a processor 100 is shown. In the illustrated embodiment, the processor 100 includes an instruction cache and fetch control unit 112, a decode unit 114, a map unit 116, a dispatch unit 118, a set of reservation stations 122A-122N, a set of execution units 124A-124N, and one or more register files 130. The instruction cache and fetch control unit 112 is coupled to the decode unit 114, which is coupled to the map unit 116. The map unit 116 is coupled to the dispatch unit 118, which is further coupled to the reservation stations 122A-122N. The reservation stations 122A-122N are coupled to respective execution units 124A-124N and the register file(s) 130. The register file(s) 130 are further coupled to the execution units 124A-124N. It is noted that processor 100 may include other components and interfaces not shown in FIG. 1.

In one embodiment, the dispatch unit 118 may include a set of dispatch buffers 120A-120N, which are representative of any number of dispatch buffers. Each of the dispatch buffers 120A-120N is coupled to a corresponding reservation station 122A-122N. For example, dispatch buffer 120A is coupled to reservation station 122A. Additionally, in some embodiments, dispatch buffer 120A may also be coupled to reservation station 122B and/or one or more other reservation stations. Similarly, dispatch buffer 120B is coupled to reservation station 122B and may also be coupled to one or more other reservation stations. It should be understood that any configuration of dispatch buffers and reservation stations may be utilized depending on the embodiment. For example, in another embodiment, each dispatch buffer 120 may be coupled to two separate reservation stations 122. Other embodiments may implement more than two reservation stations per dispatch buffer 120, if desired.

In various embodiments, instruction operations may be captured by the dispatch buffers 120A-120N based on the type of instruction operation (e.g. integer, load/store, or floating point). As mentioned previously, the term "instruction operation" may be more briefly referred to herein as an "op." In one embodiment, load/store ops may be captured by dispatch buffer 120A, which may be coupled to a load/store reservation station 122A, which may be further coupled to a load/store execution unit 124A. In this embodiment, integer ops may be captured by the dispatch buffer 120B and floating point ops may be captured by dispatch buffer 120N. Alternatively, in another embodiment, dispatch buffer 120A may be coupled to two load/store reservation stations 122A-B, which may each be coupled to a corresponding load/store execution unit 124A-B. More than one integer reservation station and/or more than one floating point reservation station may also be utilized, depending on the embodiment.

Among ops of a given type, more than one of the dispatch buffers 120A-120N may be eligible to receive the ops. For example, integer ops may be received by multiple of dispatch buffers 120A-120N. Some ops may be restricted to a particular dispatch buffer, dependent on the hardware implemented in the corresponding execution units. For example, the execution unit 124A may be the only integer execution unit with a multiplier in one embodiment. Similarly, the execution unit 124B may be the only integer execution unit with a divider in one embodiment. Still further, the execution unit 124N may be the only unit having branch processing circuitry. Other integer ops (e.g. add/subtract ops, logical ops, shift/rotate ops, etc.) may be executed by any integer execution unit of execution units 124A-N. Other embodiments may include different hardware definitions and different numbers of execution units having specific execution hardware, as desired.

The instruction cache and fetch control unit 112 may be configured to cache instructions previously fetched from memory, and may be configured to speculatively fetch a stream of instructions for the processor 100. The instruction cache and fetch control unit 112 may implement various prediction structures to predict the fetch stream. For example, a next fetch predictor may be used to predict fetch addresses based on previously executed instruction streams. Branch predictors of various types may be used to verify the next fetch prediction, or may be used to predict next fetch addresses if the next fetch predictor is not used.

The decode unit 114 may be configured to decode the instructions into instruction operations that are executable by the execution units 124A-124N. In some embodiments, a given instruction may be decoded into one or more instruction operations, depending on the complexity of the instruction. Particularly complex instructions may be microcoded, in some embodiments. In such embodiments, the microcode routine for the instruction may be coded in micro-ops (or μops). For the purposes of simplicity, the terms "instruction operation", "op", and "μop" may be used interchangeably herein. In other embodiments, each instruction in the instruction set architecture implemented by the processor 100 may be decoded into a single instruction operation, and thus the instruction operation may be essentially synonymous with instruction (although it may be modified in form by the decoder). The map unit 116 may be configured to perform register renaming on the ops, assigning physical registers in the register files 130 for each source and destination register in the ops. In one embodiment, map unit 116 may be configured to generate dependency vectors for the ops, wherein the dependency vectors identify the ops on which a given op is dependent. The map unit 116 may provide the dependency vectors for each op to dispatch unit 118 and/or reservation stations 122A-N.

In one embodiment, the reservation stations 122A-122N may each store ops to be executed by a corresponding execution unit 124A-124N. That is, in this embodiment, there is a one-to-one correspondence between reservation stations 122A-122N and execution units 124A-124N. The reservation stations 122A-122N may be configured to track dependencies of the ops stored therein, and may be configured to schedule ops for which the dependencies have been satisfied (or are currently being satisfied by an executing op which will forward the result data to the op). In this embodiment, the reservation stations 122A-122N may track dependencies but may not actually capture operand data. Instead, register files 130 may be used to read the operand data (and there may be forwarding paths for results generated by the execution units 124A-124N). Thus, the reservation stations 122A-122N may include storage implementing a number of entries for ops (e.g., random access memory arrays, flops, registers) as well as control circuitry configured to track/resolve dependencies and to schedule ops. Other embodiments may be configured to capture the operand data in the reservation stations as well. In such embodiments, the register files 130 may be read as each op enters the reservation stations 122A-122N, and forwarded results may be captured by the reservation stations 122A-122N in addition to the register files 130 updating with the forwarded results.

In one embodiment, ops may be scheduled for execution assuming that load ops will hit in the cache (not shown). In various embodiments, there may be a several cycle window of time for each load op until the hit/miss is known, and ops that are scheduled in this window need to be re-executed if they depend (directly or indirectly) on the load op and the load op is a miss. This window of time may be referred to herein as a "shadow kill window". Accordingly, ops may be held in a reservation station 122 for a number of cycles equal to the shadow kill window after they are issued to be able to rollback the reservation station 122 in case of a shadow replay. However, in some embodiments, non-load ops without dependencies may be released early before the shadow kill window has expired, allowing space in reservation stations 122A-N to be used more efficiently. In various embodiments, a dependency check may be performed for determining dependencies between ops being processed by processor 100. In one embodiment, a load-store execution unit may include a load queue (not shown) and store queue (not shown), and a dependency check may be implemented by performing content-addressable-memory (CAM) accesses of the load queue and/or store queue to compare addresses between in-flight load and store ops. In another embodiment, determining a dependency between a producing op and a consuming op may occur prior to or during a register renaming stage in processor 100. For example, the destination register of a first op may be determined to match the source register of a second op. In other embodiments, dependencies between in-flight ops may be determined using other suitable techniques.

The register files 130 may be one or more sets of physical registers which may be mapped to the architected registers coded into the instructions stored in the instruction cache and fetch control unit 112. There may be separate physical registers for different operand types (e.g., integer, media, floating point) in an embodiment. In other embodiments, the physical registers may be shared over operand types. The register files 130 may be configured to output operands read in response to ops issued for execution by the reservation stations 122A-122N to the respective execution units 124A-124N. The register files 130 may also be configured to capture results generated by the execution units 124A-124N and written to the destination registers of the ops.

One or more of execution units 124A-124N may be an integer execution unit which is configured to execute integer ops. Generally, an integer op is an op which performs a defined operation on integer operands. Integers may be numeric values in which each value corresponds to a mathematical integer. Different circuitry may be allocated to different ones of execution units 124A-124N for performing different types of operations on integer operands. For example, a first execution unit 124 may include a multiplier, a second execution unit 124 may include a divider, a third execution unit 124 may include branch processing hardware to process branch ops, and so on. In one embodiment, each of the integer execution units may include adder hardware, shift/rotate hardware, logical operation hardware, etc. to perform dynamically-assigned integer operations.

One or more of execution units 124A-124N may be a load/store execution unit which is configured to execute load/store ops. Generally, a load op may specify a transfer of data from a memory location to a register, while a store op may specify a transfer of data from a register to a memory location. The load/store execution unit(s) may include load queues, store queues, and/or load/store queues to handle load/store ops that have generated memory addresses but are awaiting cache fills or to commit data to the cache or memory. A data cache, not shown, may be coupled to the load/store execution units and may be accessed to complete load/store ops without transmission to the memory subsystem in the case of a cache hit.

One or more of execution units 124A-124N may be a floating point execution unit which is configured to execute floating point ops. Generally, floating point ops may be ops that have been defined to operate on floating point operands.

A floating point operand is an operand that is represented as a base raised to an exponent power and multiplied by a mantissa (or significand). The exponent, the sign of the operand, and the mantissa/significand may be represented explicitly in the operand and the base may be implicit (e.g. base 2, in an embodiment).

In various embodiments, additional execution units of other types may also be included (e.g., media units). Generally, media units may be configured to execute median ops. Median ops may be ops that have been defined to process media data (e.g., image data such as pixels, audio data). Media processing may be characterized by performing the same processing on significant amounts of data, where each datum is a relatively small value (e.g., 8 bits or 16 bits, compared to 32 bits to 64 bits for an integer). Thus, median ops often include single instruction-multiple data (SIMD) or vector operations on an operand that represents multiple media data.

Each execution unit may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit 124A-124N may be an independent pipe for executing ops. The reservation stations 122A-122N may be part of the independent pipe with the corresponding execution unit 124A-124N.

Figure 2:
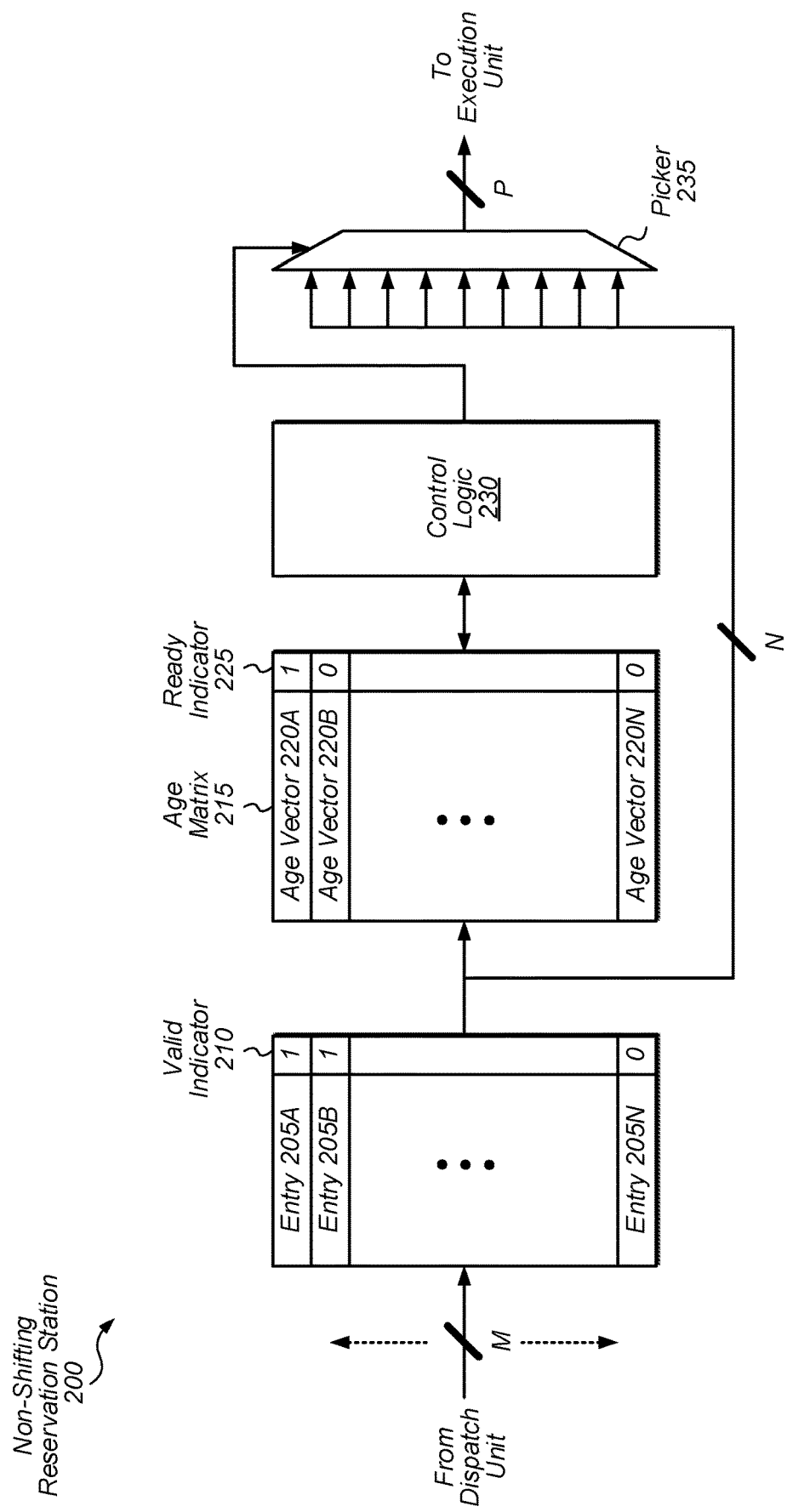
FIG. 2 is a block diagram of one embodiment of a non-shifting reservation station.

Turning now to FIG. 2, a generalized block diagram of one embodiment of a non-shifting reservation station 200 is shown. Reservation station 200 includes entries 205A-N, age matrix 215, control logic 230, and selection logic (picker 235). A dispatch unit (not shown) may be configured to dispatch up to 'M' ops per cycle to reservation station 200, wherein 'M' is a positive integer. In one embodiment, the value of 'M' may be three, while the value of 'M' may vary in other embodiments. Additionally, the dispatch unit may be configured to dispatch an op to any of the entries 205A-N of reservation station 200. In various embodiments, the dispatch unit may be configured to maintain a free list of reservation station entries for use in determining where to write ops in reservation station 200.

Each entry 205A-N may store an op dispatched from the dispatch unit. Each entry 205A-N may also include a valid indicator 210 (e.g., a single bit '1' or '0') to indicate if the entry contains a valid op. Each entry 205A-N may also include any number of other fields associated with the op, depending on the embodiment. Reservation station 200 may also include age matrix 215, which includes age vectors 220A-N corresponding to entries 205A-N. Each age vector 220A-N may indicate if the corresponding entry's op is older than the other ops in the other entries 205A-N. Reservation station 200 may also include a ready indicator 225 for each entry 205A-N to indicate if the op in the corresponding entry is ready to be issued. In various embodiments, an entry may be ready to be issued if all of the op's sources are ready.

Figure 9:
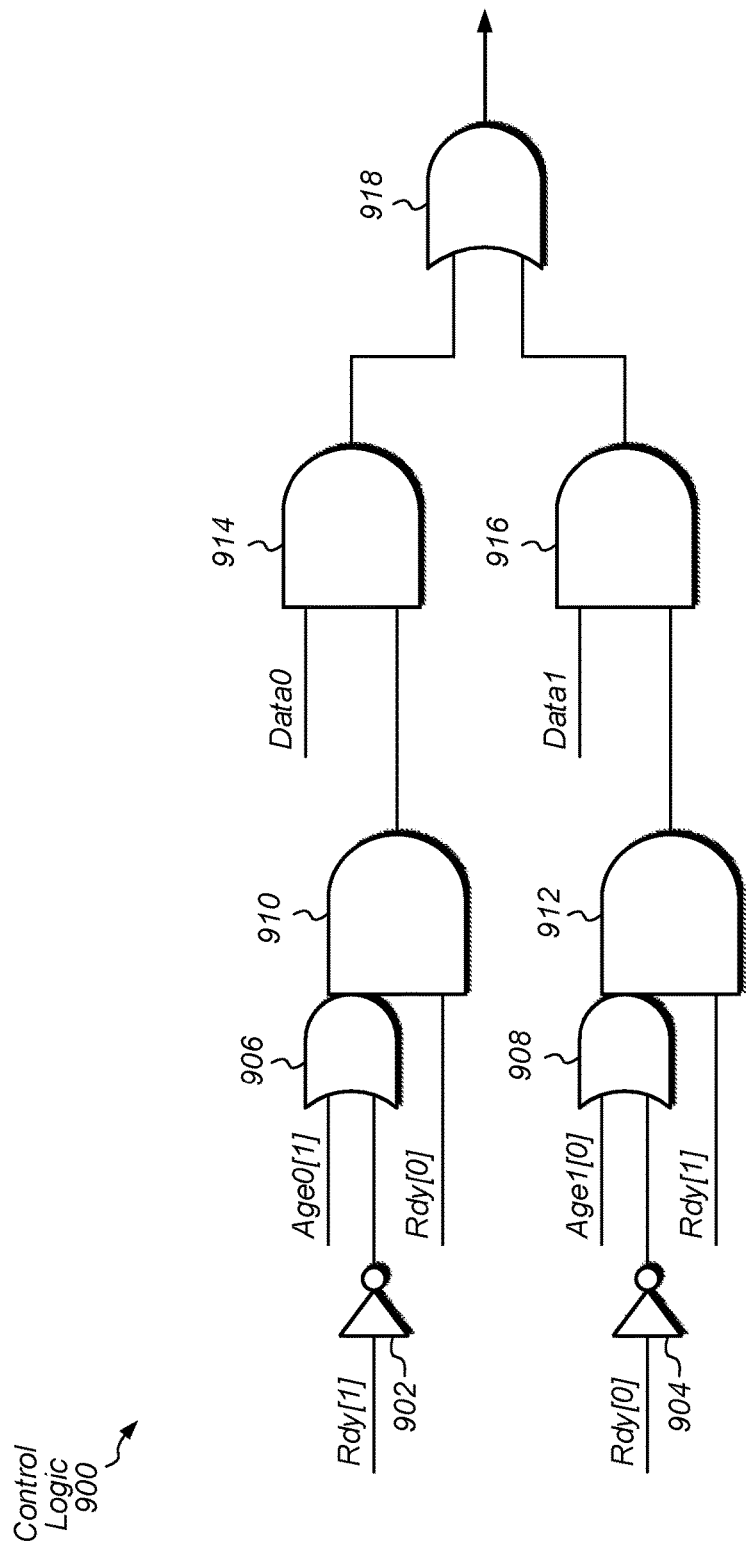
FIG. 9 is a block diagram of one embodiment of control logic.

In one embodiment, control logic 230 may be configured to mask off the age vectors of ops from entries 205A-N which are not ready. For example, the op in entry 205B may be the oldest op in reservation station 200, but if this op is not ready (as indicated by its ready indicator 225 being set to '0'), then this op should not prevent younger ready ops from being issued. Accordingly, control logic 230 may mask off age vectors of non-ready ops as if these ops were the youngest entries in reservation station 200. Control logic 230 may also cause the age vectors of the ready ops to indicate that they are older than all non-ready ops, even if some of the non-ready ops are actually older than the ready ops. An example of one embodiment of control logic 230 is shown in FIG. 9 and described in further detail below.

Picker 235 is representative of any number of pickers which may be utilized with reservation station 200. In one embodiment, picker 235 may be configured to select the 'P' oldest ready ops from entries 205A-N in a given clock cycle for issuance to a corresponding execution unit (not shown), wherein 'P' is a positive integer. In one embodiment, 'P' may be two, while the value of 'P' may vary in other embodiments. In another embodiment, picker 235 may be configured to select the oldest ready op from entries 205A-N as well as one or more other ready ops in a given clock cycle. For example, in one embodiment, in a given clock cycle, a first picker 235 may be configured to select the oldest ready op from the even entries of entries 205A-N and a second picker 235 may be configured to select the oldest ready op from the odd entries of entries 205A-N. These two selected ops may then be issued to the corresponding execution unit. Other techniques for selecting ops for issuance from reservation station 200 are possible and are contemplated. In some embodiments, picker 235 may be a multiplexer and/or other logic that is configured to select ops based on instructions or signals received from control logic 230.

Figure 3:
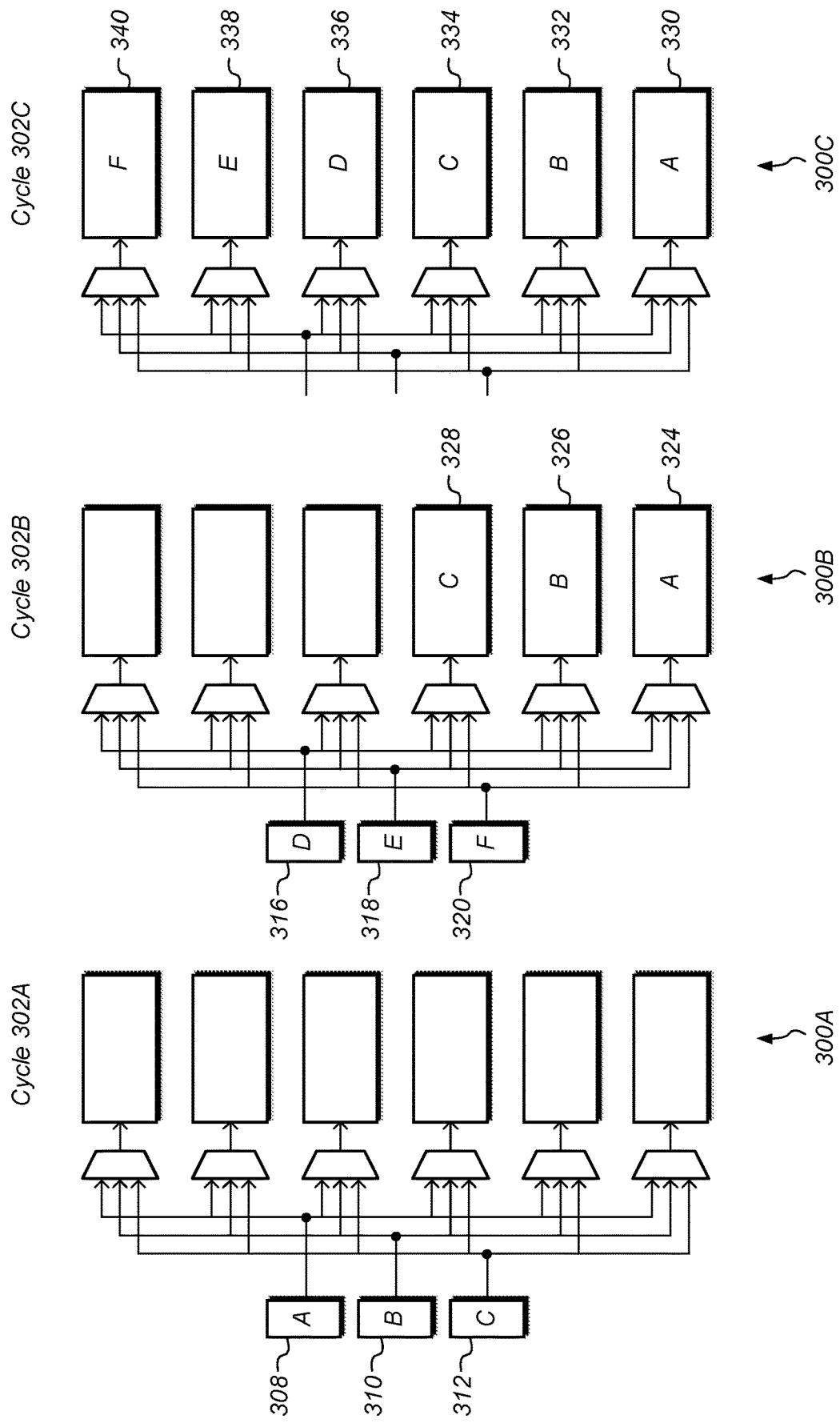
FIG. 3 is a block diagram of another embodiment of a non-shifting reservation station over three clock cycles.

Referring now to FIG. 3, a block diagram of another embodiment of a non-shifting reservation station 300A-C over three clock cycles 302A-C is shown. A dispatch unit (not shown) may be configured to write an instruction operation (or op) to any of the plurality of entries of non-shifting reservation station 300. In one embodiment, the dispatch unit may be coupled to each entry of reservation station 300 via a three-input mux as shown in FIG. 3, allowing the dispatch unit to dispatch an op to any entry of reservation station 300 depending on which entries are free. While this embodiment shows a dispatch unit with the ability to write three ops to reservation station 300 per clock cycle, other embodiments may include a dispatch unit configured to write other numbers of ops to reservation station 300 in a single clock cycle. Additionally, while reservation stations 300A-C are shown as having six entries, this is merely for illustrative purposes, and it should be understood that a reservation station may have any number of entries (e.g., 16, 32) depending on the embodiment. Reservation station 300A is intended to represent a given reservation station in clock cycle 302A, while reservation station 300B is intended to represent the given reservation station in clock cycle 302B, and reservation station 300C is intended to represent the given reservation station in clock cycle 302C. Clock cycles 302A-C are intended to represent three consecutive clock cycles, with clock cycle 302A occurring prior to clock cycle 302B and clock cycle 302B occurring prior to clock cycle 302C.

Reservation station 300A is shown as being empty in cycle 302A prior to having any ops written to its entries. Ops A, B, and C, which are labeled as 308, 310, and 312, respectively, are shown as being ready to be dispatched while the reservation station 300A is empty in cycle 302A. Ops A-C are then written to entries 324, 326, and 328, respectively, of reservation station 300B in cycle 302B. During cycle 302B, the ops D, E, and F are ready to be dispatched in the next clock cycle 302C. Accordingly, ops D-F are written to entries 336, 338, and 340 of reservation station 300C in cycle 302C. Since reservation station 300 is a non-shifting reservation station, ops A-C may remain in the same entries, without being shifted up, when the new ops D-F are written to reservation station 300C in clock cycle 302C. Accordingly, ops A-C remain in entries 330, 332, and 334, respectively, in clock cycle 302C, with entries 330, 332, and 334 corresponding to entries 324, 326, and 328, respectively, of reservation station 300B in clock cycle 302B.

Figure 4:
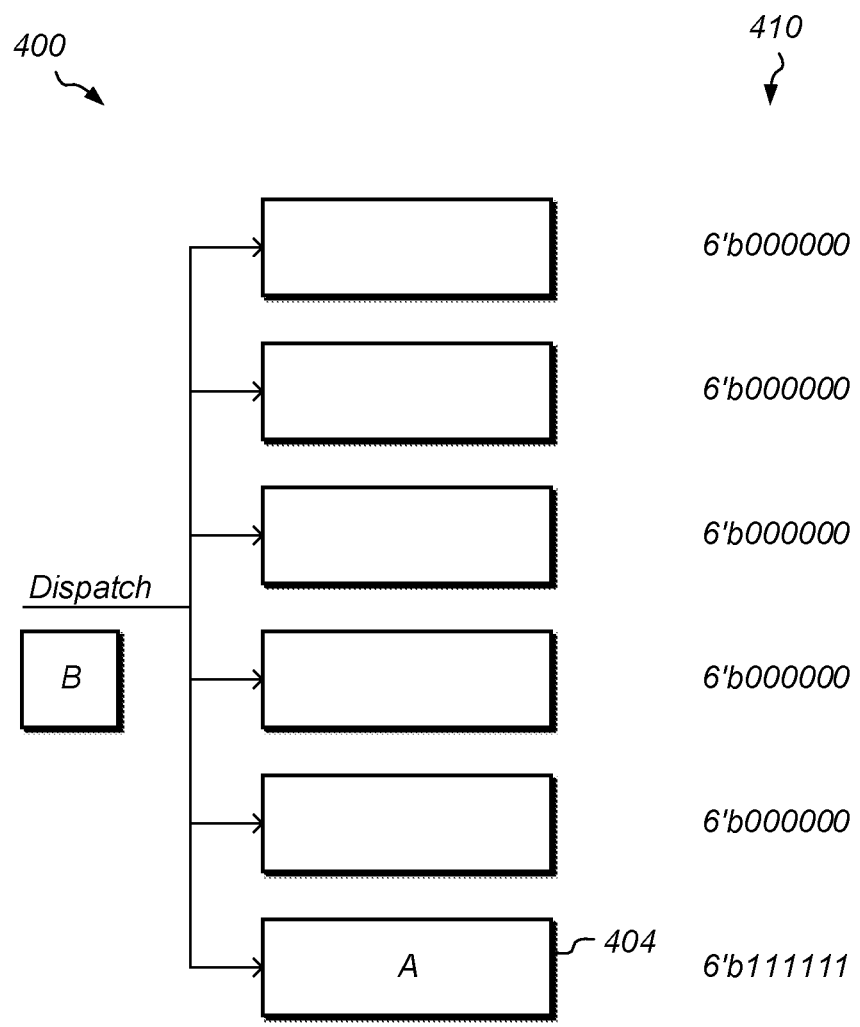
FIG. 4 is a block diagram of another embodiment of a non-shifting reservation station.

Turning now to FIG. 4, a block diagram of another embodiment of a non-shifting reservation station (RS) 400 is shown. It is noted that RS 400 may include other logic (e.g., control logic, picker) and interfaces not shown in FIG. 4. The example of RS 400 having six entries is intended merely for illustrative purposes. It should be understood that a non-shifting RS may have any number of entries, depending on the embodiment.

A dispatch unit (not shown) may be coupled to each entry of RS 400, such that the dispatch unit is configured to write to any entry of RS 400 in any clock cycle. The dispatch unit may also be configured to write multiple ops to multiple entries of RS 400 in a single clock cycle. Whereas a shifting RS would only be coupled to a dispatch unit for one or a small number of its entries, each entry of RS 400 is writable by the dispatch unit.

As shown in RS 400, op A is already stored in entry 404 of RS 400 while op B is waiting to be written to RS 400 in a subsequent clock cycle. Age matrix 410 is shown to the right of RS 400, and each entry of RS 400 may be configured to keep track of which entries it is older than using a corresponding age vector of age matrix 410. In one embodiment, each age vector may include bits to indicate which entries a given entry is older than. For example, the age vector corresponding to entry 404 has all '1' bits to indicate that op A in entry 404 is older than all other entries. This is the case since all of the other entries at this particular point in time are empty. The age vectors for the other entries may have all '0' bits to indicate that these entries are not older than the other entries. In one embodiment, during dispatch, each age vector corresponding to a valid entry of RS 400 may be updated so that it is made older than the incoming op(s). Also, during dequeuing from RS 400, every valid entry may be marked as being older than the entries corresponding to the dequeuing op(s).

In one embodiment, age matrix 410 may be utilized to pick the oldest ready op in a given clock cycle. In another embodiment, age matrix 410 may be utilized to pick the 'P' oldest ready ops, wherein 'P' is a positive integer greater than one. It is noted that the term "oldest" when used to describe an op refers to the op that is earliest in program order.

Figure 5:
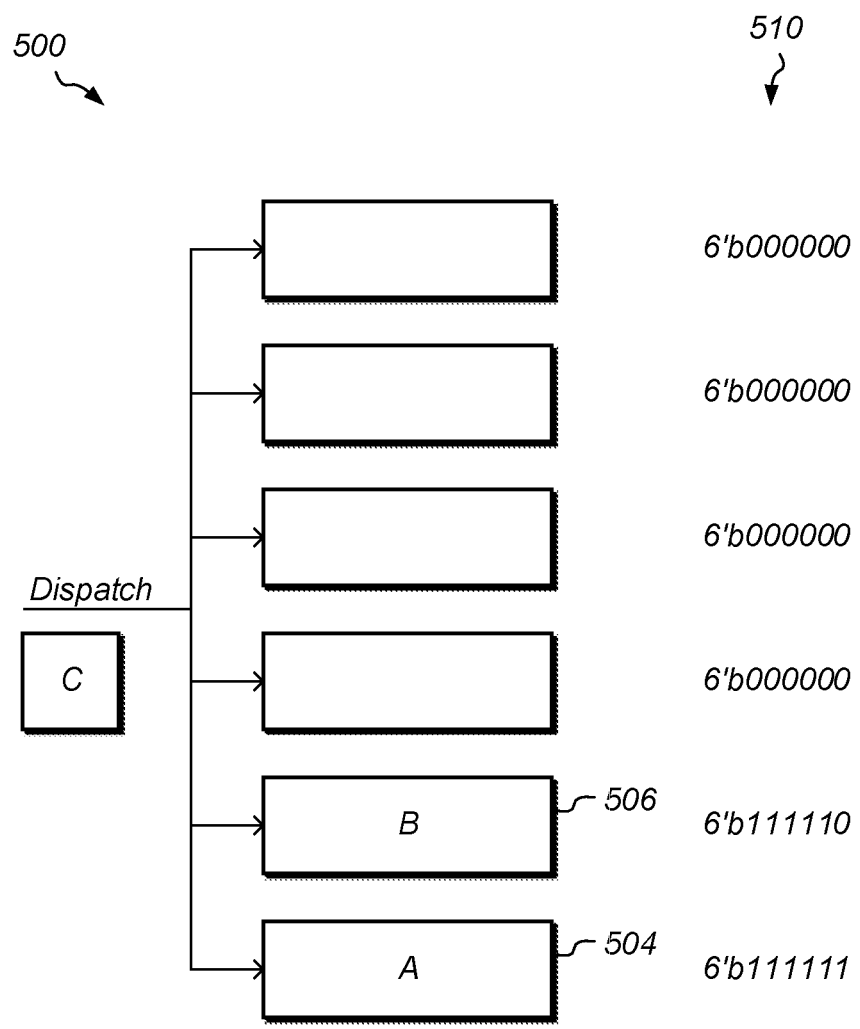
FIG. 5 is a block diagram of another embodiment of a non-shifting reservation station.

Referring now to FIG. 5, another block diagram of a non-shifting RS 500 is shown. RS 500 is intended to represent RS 400 (of FIG. 4) in a subsequent clock cycle. Op B is written to entry 506 while op A remains in entry 504. Since op A is the oldest op stored in RS 500, op A has an age vector of age matrix 510 storing all '1' bits. When op B is dispatched into entry 506, its corresponding age vector may be "111110" to indicate that op B is older than the four upper entries of RS 500 with the '0' in the 6$^{th}$ bit place indicating that op B is younger than op A in entry 504. As shown to the left of RS 500, op C is waiting to be dispatched to RS 500 in a subsequent clock cycle.

Figure 6:
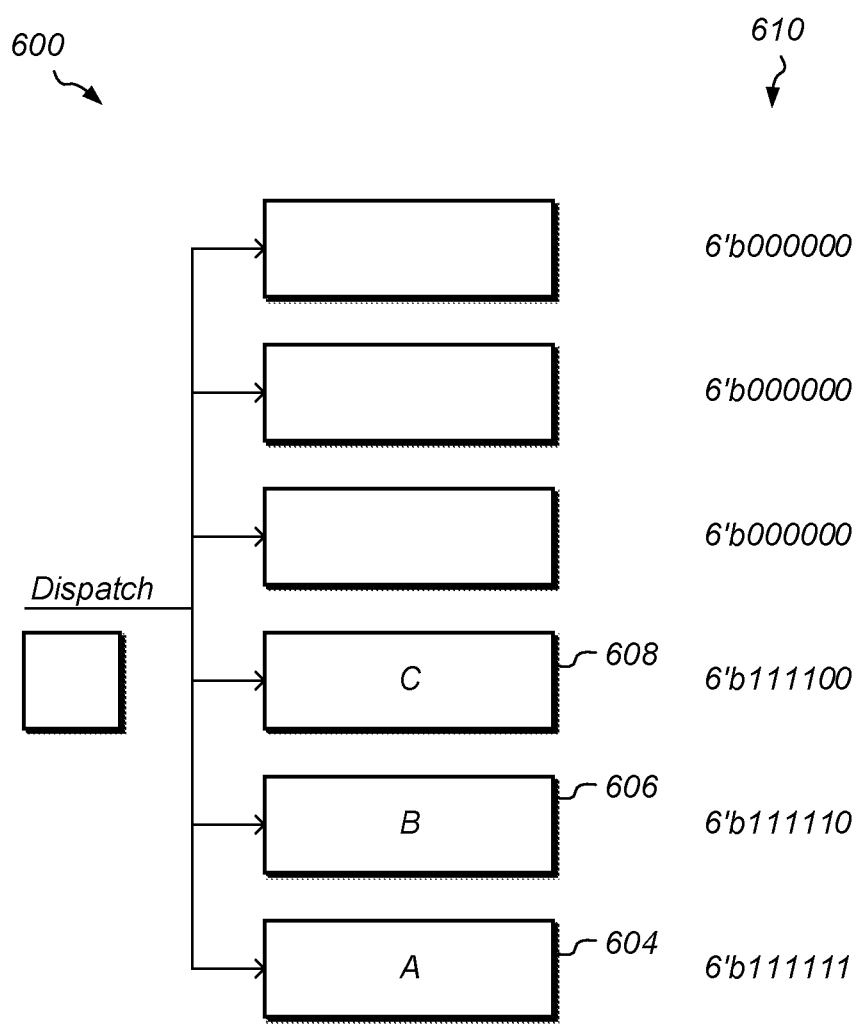
FIG. 6 is a block diagram of another embodiment of a non-shifting reservation station.

Turning now to FIG. 6, another block diagram of a non-shifting RS 600 is shown. RS 600 is intended to represent RS 500 (of FIG. 5) in a subsequent clock cycle. Op C is written to entry 608 while ops A and B remain in entries 604 and 606, respectively. When op C is written into entry 608, its corresponding age vector of age matrix 610 may be "111100" to indicate that op C is older than the three upper entries of RS 600 with the '0's in the 5$^{th}$ and 6$^{th}$ bit places indicating that op C is younger than ops A and B in entries 604 and 606. It is noted that in another embodiment, the designation of bits in the age vectors may be reversed such that a '1' bit signifies that an op is younger than a corresponding op and a '0' bit signifies that the op is older than the corresponding op.

Figure 7:
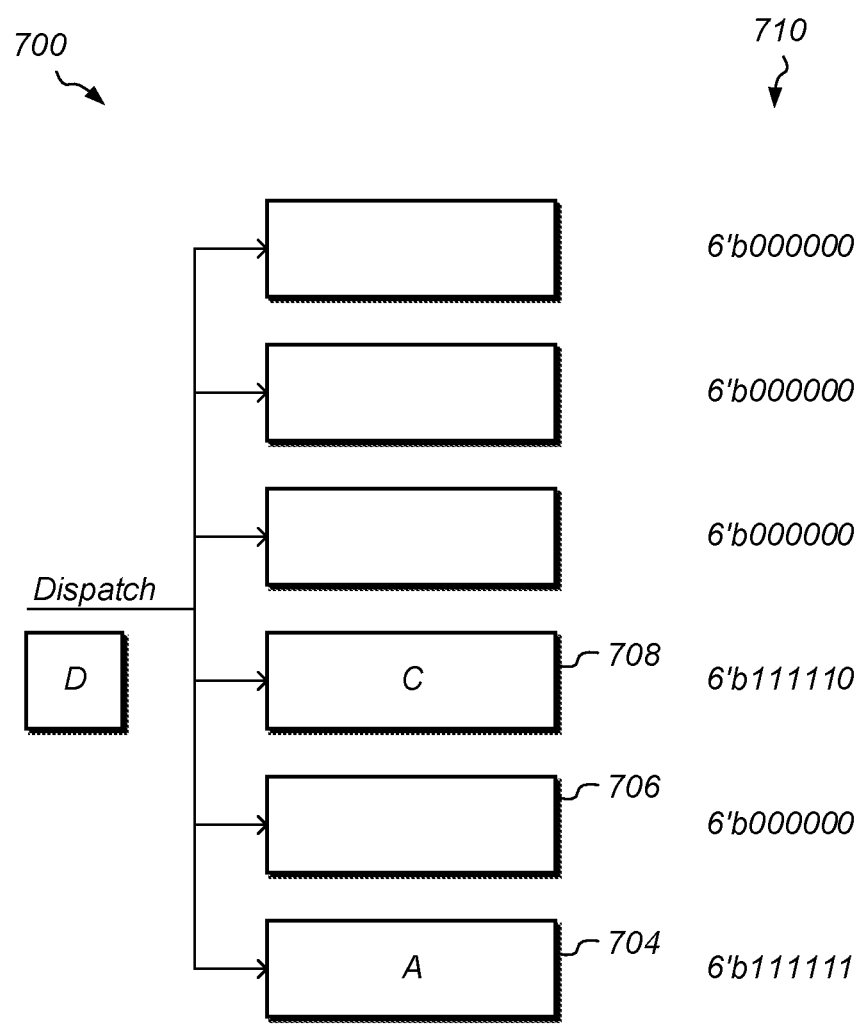
FIG. 7 is a block diagram of another embodiment of a non-shifting reservation station.

Referring now to FIG. 7, another block diagram of a non-shifting RS 700 is shown. RS 700 is intended to represent RS 600 (of FIG. 6) in a subsequent clock cycle. As shown in FIG. 7, op B has issued and been dequeued from entry 706 while ops A and C remain in entries 704 and 708, respectively. Op A has an age vector of age matrix 710 storing all '1' bits, while the age vector of op C has been updated from "111100" to "111110" to indicate that op C is older than entry 706 which is now empty. As shown to the left of RS 700, op D is ready to be dispatched to RS 700 in a subsequent clock cycle.

Figure 8:
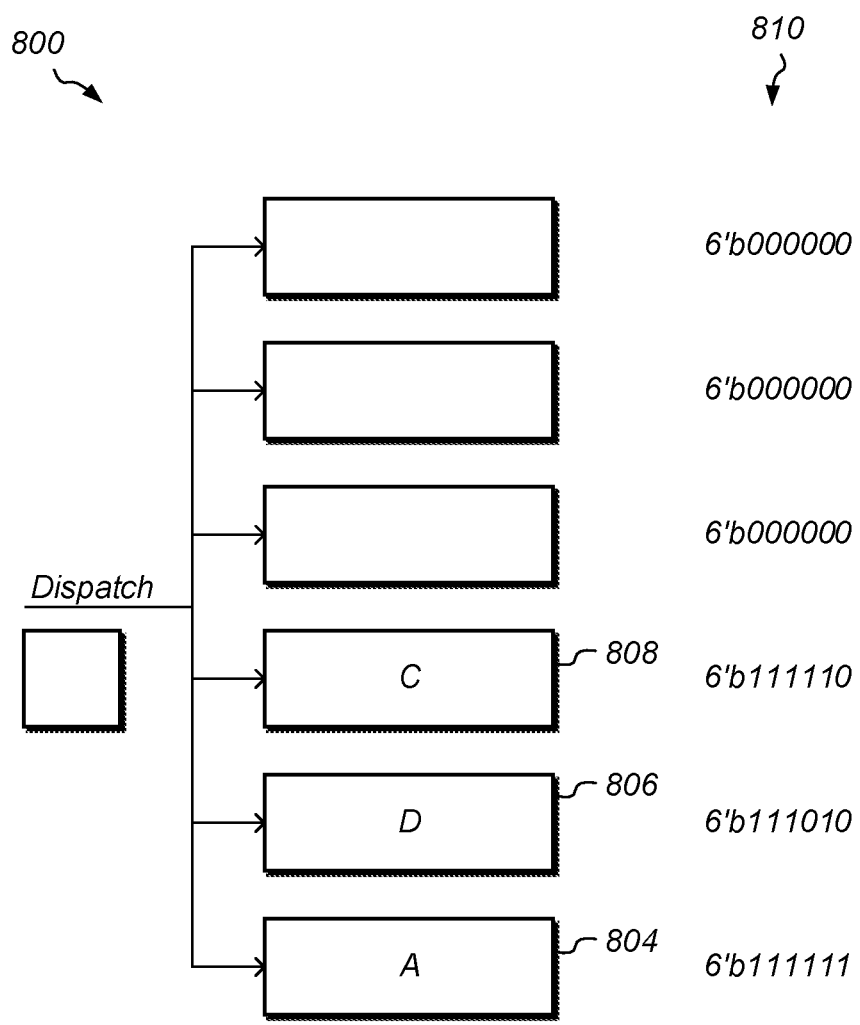
FIG. 8 is a block diagram of another embodiment of a non-shifting reservation station.

Turning now to FIG. 8, another block diagram of a non-shifting RS 800 is shown. RS 800 is intended to represent RS 700 (of FIG. 7) in a subsequent clock cycle. Op D is written to entry 806 while ops A and C remain in entries 804 and 808, respectively. Ops A and C have the same age vectors of age matrix 810 as were previously shown in age matrix 710. When op D is dispatched into entry 806, the corresponding age vector may be "111010" with the "111" pattern indicating that op D is older than the three upper entries of RS 800 and with the '0' in the 4$^{th}$ and 6$^{th}$ bit places indicating that op D is younger than ops C and A in entries 808 and 804, respectively.

Referring now to FIG. 9, a block diagram of one embodiment of control logic 900 is shown. In one embodiment, control logic 230 of FIG. 2 may include at least the logic shown in control logic 900 of FIG. 9. Control logic 900 includes logic for selecting the oldest ready op from two different ops. The example of control logic 900 illustrated in FIG. 9 may be extended for selecting the oldest ready op among 'N' different ops, wherein 'N' is the number of entries in the reservation station, with 'N' varying from embodiment to embodiment.

Control logic 900 includes inverters 902 and 904 for coupling ready signals from entries 1 and 0, respectively. The output of inverters 902 and 904 may be coupled to OR gates 906 and 908, respectively. Also, age signals 0[1] and 1[0] may be coupled to the other inputs of OR gates 906 and 908, respectively. The age signals 0[1] and 1[0] may be extracted from age vectors corresponding to the entries 0 and 1, respectively. The outputs of OR gates 906 and 908 may be coupled to the inputs of AND gates 910 and 912, respectively. The ready signals from entries 0 and 1 may be coupled to the other inputs of AND gates 910 and 912, respectively. By coupling the ready signals in this manner, an entry which is not ready is effectively masked and prevented from being selected for issuance from the reservation station, even if the entry is the older of the two entries.

The outputs of AND gates 910 and 912 may be coupled to the inputs of AND gates 914 and 916, respectively. The ops corresponding to entries 0 and 1, which are labeled as "data0" and "data1", may be coupled to the other inputs of AND gates 914 and 916, respectively. The outputs of AND gates 914 and 916 may be coupled to OR gate 918, with the output of OR gate 918 being the oldest ready op of entries 0 and 1 for the given clock cycle. The logic shown in control logic 900 may be extended to accommodate embodiments with more than two reservation station entries.

Figure 10:
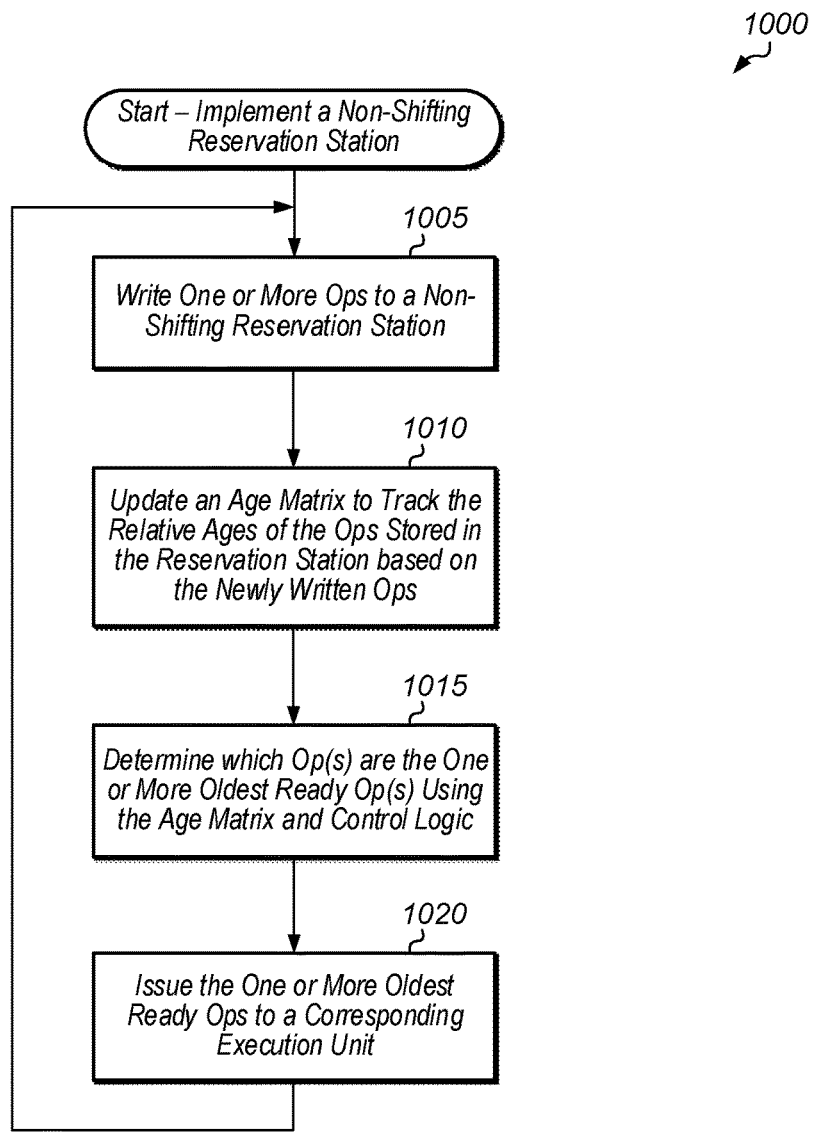
FIG. 10 is a generalized flow diagram illustrating one embodiment of a method for implementing a non-shifting reservation station.

Turning now to FIG. 10, one embodiment of a method 1000 for implementing a non-shifting reservation station is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein may be configured to implement method 1000.

A dispatch unit may write one or more ops to a non-shifting reservation station (block 1005). The dispatch unit may be configured to write the one or more ops to any free entries of a plurality of entries of the non-shifting reservation station. Next, the non-shifting reservation station may update an age matrix to track the relative ages of the ops stored in the non-shifting reservation station based on the newly written ops (block 1010). The non-shifting reservation station may update the age vector(s) of the one or more newly written ops to indicate that they are younger than all other valid entries in the non-shifting reservation station. The non-shifting reservation station may also update the age vectors of the existing ops to indicate that they are older than the one or more newly written ops.

Then, the non-shifting reservation station may determine which op(s) are the one or more oldest ready op(s) using the age matrix and control logic (block 1015). In one embodiment, the control logic may mask one or more age vectors of the age matrix for entries corresponding to instruction operations which are not ready to prevent these non-ready ops from blocking younger ready ops from being issued. Then, the non-shifting reservation station may issue the one or more oldest ready ops to a corresponding execution unit (block 1020). After block 1020, method 1000 may return to block 1005 for the next clock cycle.

Figure 11:
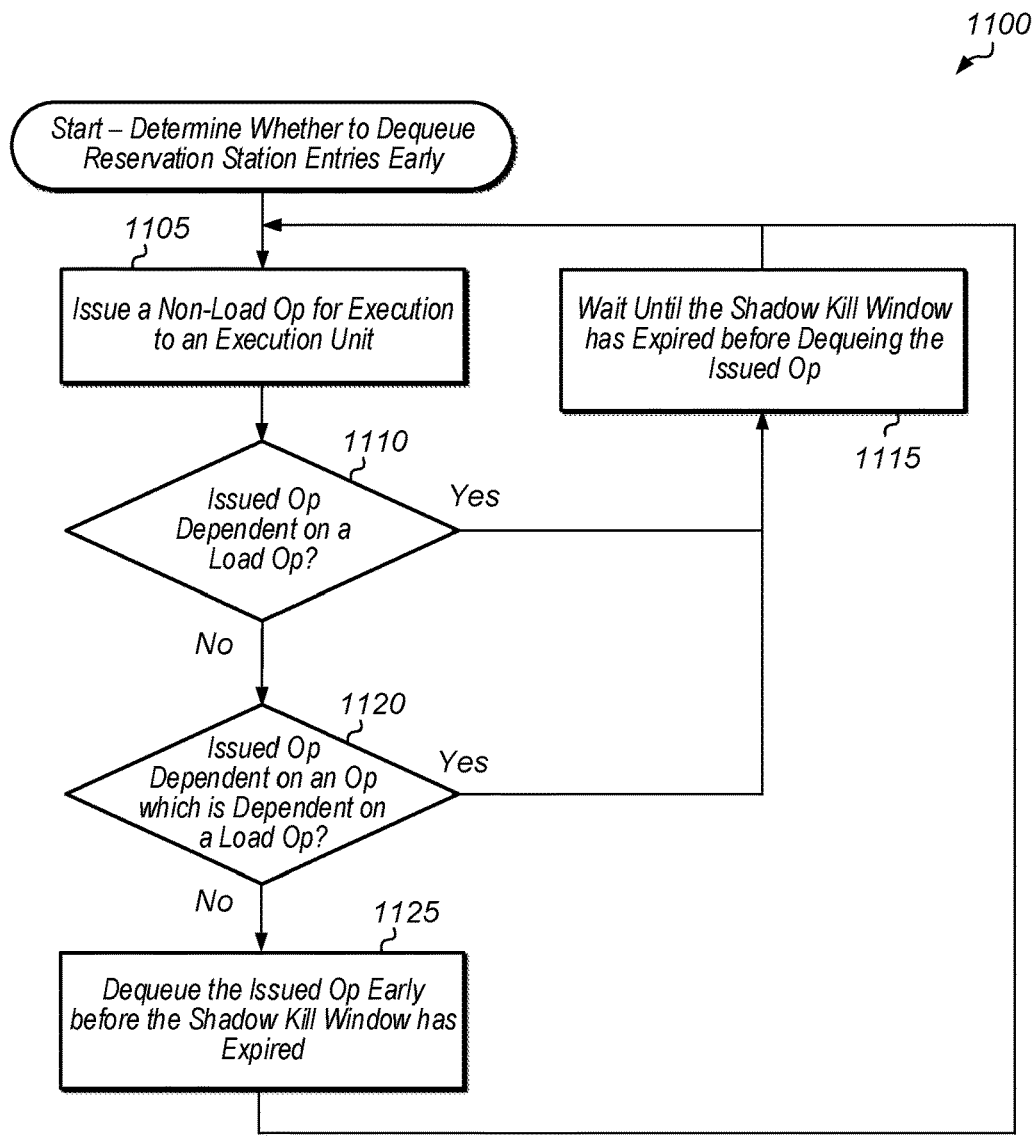
FIG. 11 is a generalized flow diagram illustrating another embodiment of a method for determining whether to dequeue reservation station entries early.

Turning now to FIG. 11, one embodiment of a method 1100 for determining whether to dequeue reservation station entries early is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein may be configured to implement method 1100.

A reservation station of a processor may issue a non-load op for execution to an execution unit (block 1105). In various embodiments, the processor may be included within a host device, wherein the host device is a smartphone, tablet, laptop computer, desktop computer, watch, server, programmable consumer electronic device, set-top box, television, satellite receiver, or other electronic device or computing system. Next, the reservation station may determine if the issued op is dependent on any load ops (conditional block 1110). In various embodiments, the processor may generate dependency vectors to track whether the in-flight ops are dependent on any loads. In one embodiment, the reservation station may read the dependency vector corresponding to the issued op in conditional block 1110 to determine whether this op is dependent on any loads.

If the issued op is dependent on a load op (conditional block 1110, "yes" leg), then the reservation station may wait until the shadow kill window has expired before dequeing the issued op (block 1115). After block 1115, method 1100 may return to block 1105 with the reservation station issuing another op for execution on the execution unit. In one embodiment, the shadow kill window may be three clock cycles, while in other embodiments, the shadow kill window may be other numbers of clock cycles. If the issued op is not dependent on a load op (conditional block 1110, "no" leg), then the reservation station may determine if the issued op is dependent on an op that is dependent on a load op (conditional block 1120). Having a direct or indirect dependency may generally be referred to as having a load dependency.

If the issued op is dependent on an op that is dependent on a load op (conditional block 1120, "yes" leg), then the reservation station may wait until the shadow kill window has expired before dequeing the issued op (block 1115). If the issued op is not dependent on an op that is dependent on a load op (conditional block 1120, "no" leg), then the reservation station may dequeue the issued op early before the shadow kill window has expired (block 1125). In one embodiment, the reservation station may dequeue the issued op immediately after issuing the op in block 1125. After block 1125, method 1100 may return to block 1105 with the reservation station issuing another op for execution on a corresponding execution unit.

Figure 12:
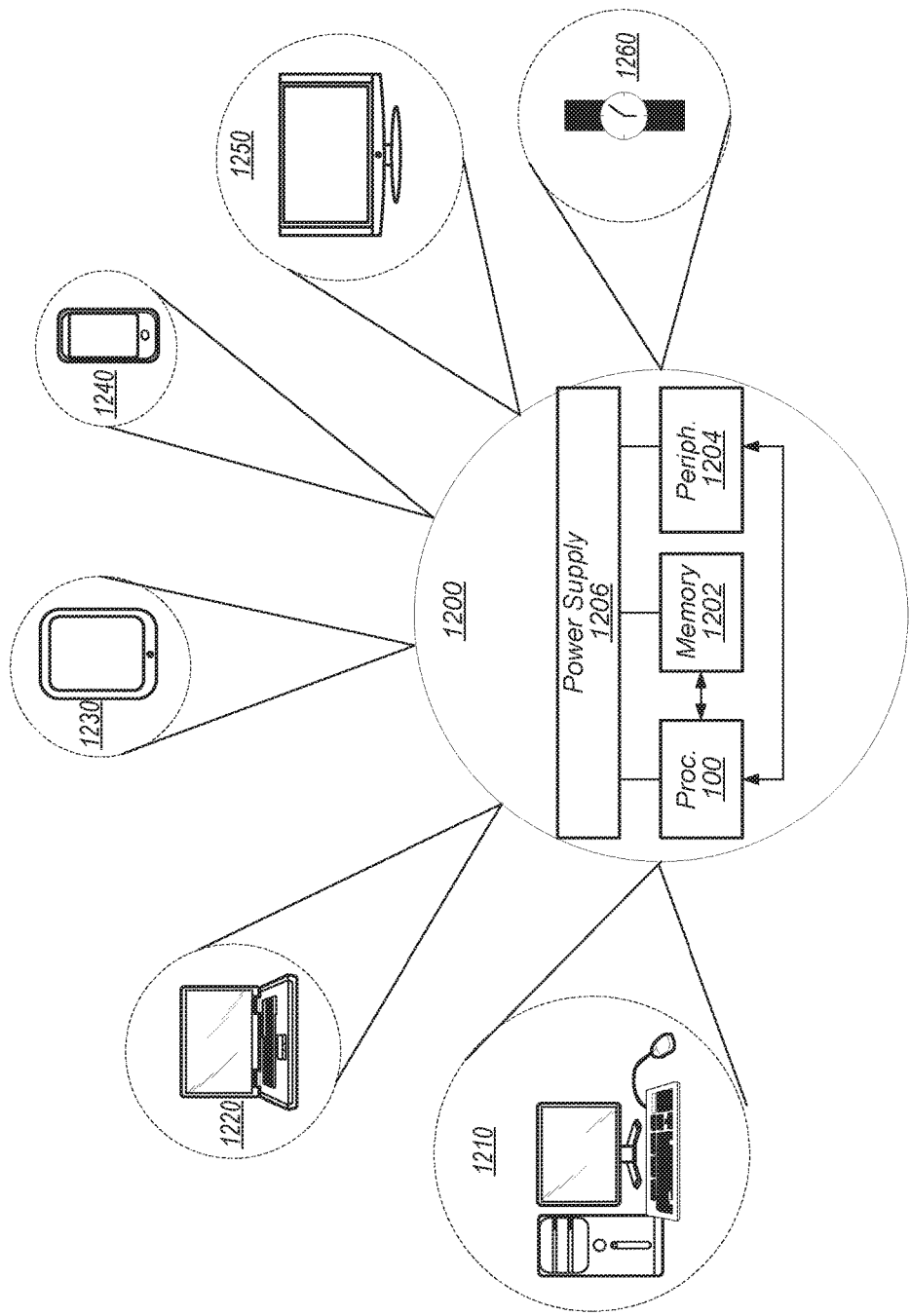
FIG. 12 is a block diagram of one embodiment of a system.

Referring next to FIG. 12, a block diagram of one embodiment of a system 1200 is shown. As shown, system 1200 may represent chip, circuitry, components, etc., of a desktop computer 1210, laptop computer 1220, tablet computer 1230, cell or mobile phone 1240, television 1250 (or set top box configured to be coupled to a television), wrist watch or other wearable item 1260, or otherwise. Other devices are possible and are contemplated. In the illustrated embodiment, the system 1200 includes at least one instance of processor 100 (of FIG. 1) coupled to an external memory 1202. In various embodiments, processor 100 may be included within a system on chip (SoC) or integrated circuit (IC) which is coupled to external memory 1202, peripherals 1204, and power supply 1206.

Processor 100 is coupled to one or more peripherals 1204 and the external memory 1202. A power supply 1206 is also provided which supplies the supply voltages to processor 100 as well as one or more supply voltages to the memory 1202 and/or the peripherals 1204. In various embodiments, power supply 1206 may represent a battery (e.g., a rechargeable battery in a smart phone, laptop or tablet computer). In some embodiments, more than one instance of processor 100 may be included (and more than one external memory 1202 may be included as well).

The memory 1202 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMM5), etc. Alternatively, the devices may be mounted with an SoC or IC containing processor 100 in a chip-on-chip configuration, a package-on-package configuration, or a multi-chip module configuration.

The peripherals 1204 may include any desired circuitry, depending on the type of system 1200. For example, in one embodiment, peripherals 1204 may include devices for various types of wireless communication, such as wifi, Bluetooth, cellular, global positioning system, etc. The peripherals 1204 may also include additional storage, including RAM storage, solid state storage, or disk storage. The peripherals 1204 may include user interface devices such as a display screen, including touch display screens or multitouch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
   an execution unit; and
   a reservation station comprising:
      a plurality of entries, each of said entries being configured to store an instruction operation prior to issuance to the execution unit;
      an indication of a relative age of each instruction operation stored in the reservation station; and
      control logic comprising circuitry for determining an oldest ready instruction operation of the instruction operations stored in the reservation station;
   wherein the reservation station is configured to:
      keep each instruction operation in an entry into which the instruction operation was originally written until issuance to the execution unit;
      in response to determining a given instruction operation is a non-load instruction operation:
         issue the given instruction operation from a given entry of the reservation station to the execution unit prior to determining whether the non-load instruction operation is dependent on a load instruction operation;
         in response to determining the non-load instruction operation is dependent on a given load instruction operation, and prior to determining whether the given load instruction is a hit or a miss, retain the non-load instruction operation in the given entry of the reservation station until expiration of a shadow kill window, wherein the shadow kill window comprises a number of cycles until a hit or miss on the cache is known; and
         in response to determining the non-load instruction is not dependent on a load instruction operation, dequeue the non-load instruction operation from the given entry of the reservation station prior to expiration of the shadow kill window.

2. The processor as recited in claim 1, wherein the control logic is configured to mask indications of age for entries corresponding to instruction operations which are not ready for execution.

3. The processor as recited in claim 1, wherein in response to determining the non-load instruction operation is not dependent on a load instruction operation, the reservation station is configured to dequeue the non-load instruction operation prior to an expiration of the shadow kill window.

4. The processor as recited in claim 1, wherein the reservation station is further configured to determine whether the non-load instruction operation is dependent on an operation that is dependent on a load instruction operation.

5. The processor as recited in claim 1, wherein the reservation station is further configured to select first and second instruction operations for issuance to the execution unit in a given clock cycle, wherein the first instruction operation is an oldest ready instruction operation from a first portion of entries of the reservation station, and wherein the second instruction operation is an oldest ready instruction operation from a second portion of entries of the reservation station.

6. A method comprising:
   storing instruction operations in a reservation station, said reservation station comprising a plurality of entries configured to store an instruction operation prior to issuance to an execution unit;
   writing an instruction operation to any of a plurality of entries of the reservation station; and
   keeping each instruction operation in an entry into which the instruction operation was originally written until issuance to the execution unit;
   in response to determining a given instruction operation is a non-load instruction operation:
      issuing the given instruction operation from a given entry of the reservation station to the execution unit prior to determining whether the non-load instruction operation is dependent on a load instruction operation;
      in response to determining the non-load instruction operation is dependent on a given load instruction operation, and prior to determining whether the given load instruction is a hit or a miss, retaining the non-load instruction operation in the given entry of the reservation station until expiration of a shadow kill window, wherein the shadow kill window comprises a number of cycles until a hit or miss on the cache is known; and
      in response to determining the non-load instruction is not dependent on a load instruction operation, dequeuing the non-load instruction operation from the given entry of the reservation station prior to expiration of the shadow kill window.

7. The method as recited in claim 6, further comprising storing an indication of a relative age of each instruction operation in the reservation station.

8. The method as recited in claim 6, wherein in response to determining the non-load instruction operation is not dependent on a load instruction operation, the method further comprises dequeuing the issued non-load instruction operation prior to an expiration of the shadow kill window.

9. The method as recited in claim 6, further comprising determining whether the non-load instruction operation is dependent on an operation that is dependent on a load instruction operation.

10. The method as recited in claim 6, further comprising selecting first and second instruction operations for issuance from the reservation station to the execution unit in a given clock cycle, wherein the first instruction operation is an oldest ready instruction operation from a first portion of entries of the reservation station, and wherein the second instruction operation is an oldest ready instruction operation from a second portion of entries of the reservation station.

11. A computing system comprising:
   a memory; and
   a processor comprising:
      an execution unit;
      a dispatch unit; and
      a reservation station comprising:
         a plurality of entries, each of said entries being configured to store an instruction operation prior to issuance to the execution unit;
         an indication of a relative age of each instruction operation stored in the reservation station; and
         control logic for determining an oldest ready instruction operation of the instruction operations stored in the reservation station;
      wherein the reservation station is configured to:
      keep each instruction operation in an entry into which the instruction operation was originally written until issuance to the execution unit;
      in response to determining a given instruction operation is a non-load instruction operation:
         issue the given instruction operation from a given entry of the reservation station to the execution unit prior to determining whether the non-load instruction operation is dependent on a load instruction operation;
         in response to determining the non-load instruction operation is dependent on a given load instruction operation, and prior to determining whether the given load instruction is a hit or a miss, retain the issued non-load instruction operation in the given entry of the reservation station until expiration of a shadow kill window, wherein the shadow kill window comprises a number of cycles until a hit or miss on the cache is known; and
         in response to determining the non-load instruction is not dependent on a load instruction operation, dequeue the non-load instruction operation from the given entry of the reservation station prior to expiration of the shadow kill window.

12. The computing system as recited in claim 11, wherein the control logic is configured to mask indications of age for entries corresponding to instruction operations which are not ready for execution.

13. The computing system as recited in claim 11, wherein in response to determining the non-load instruction operation is not dependent on a load instruction operation, the reservation station is configured to dequeue the non-load instruction operation prior to an expiration of the shadow kill window.

14. The computing system as recited in claim 13, wherein the reservation station is further configured to determine whether the non-load instruction operation is dependent on an operation that is dependent on a load instruction operation.

* * * * *

UNITED STATES PATENT AND TRADEMARK OFFICE
CERTIFICATE OF CORRECTION

PATENT NO. : 10,678,542 B2
APPLICATION NO. : 14/808811
DATED : June 9, 2020
INVENTOR(S) : Kountanis et al.

Page 1 of 1

It is certified that error appears in the above-identified patent and that said Letters Patent is hereby corrected as shown below:

In the Claims

Column 14, Claim 8, Line 56, please delete "issued".

Signed and Sealed this
Twenty-second Day of December, 2020

Andrei Iancu
*Director of the United States Patent and Trademark Office*